July 1, 1947.　　　J. E. LOVELY　　　2,423,243
TWO-SPEED DRIVE MECHANISM
Filed June 28, 1943
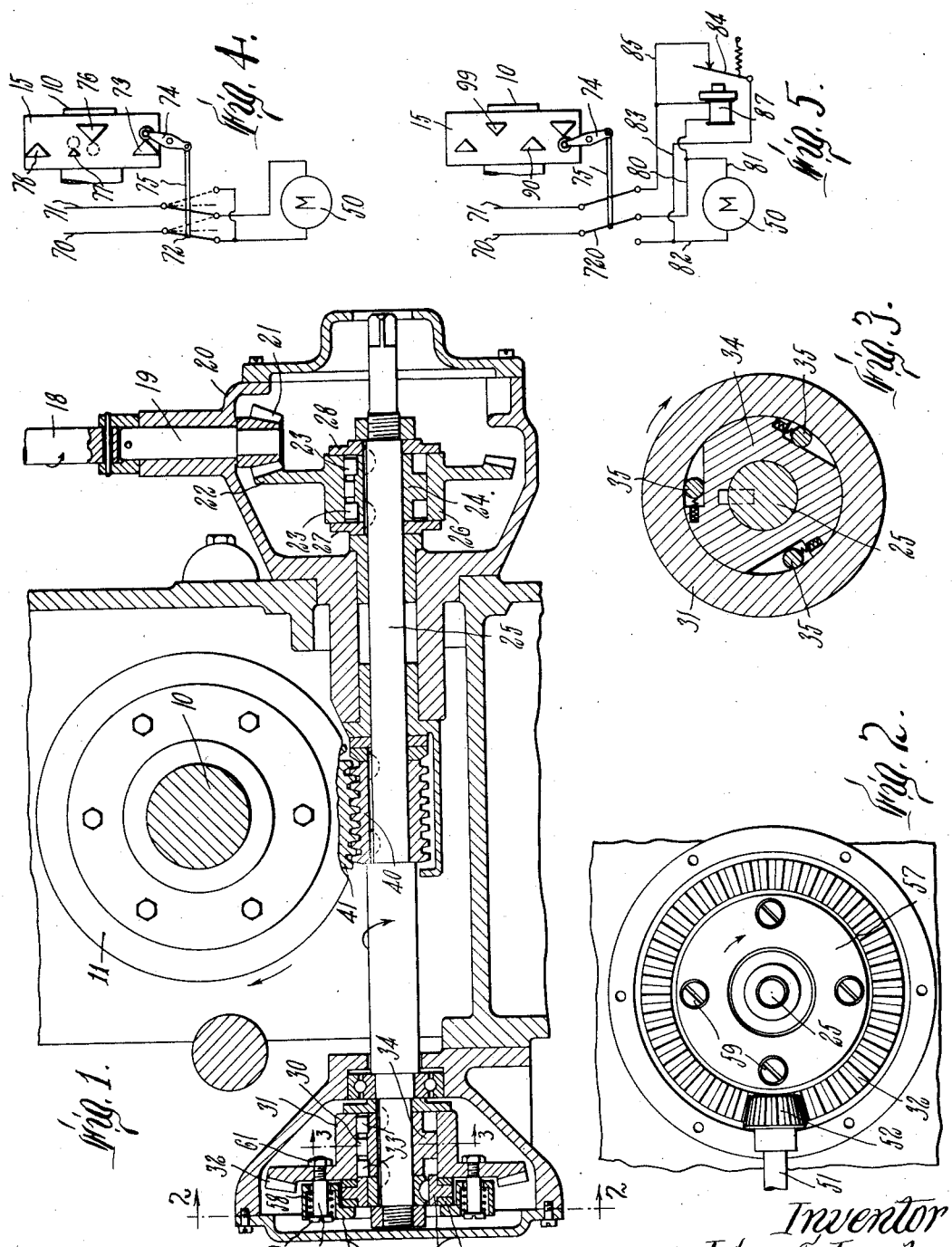
Inventor
John E. Lovely
Wright Brown Quinby & May
Attys.

Patented July 1, 1947

2,423,243

UNITED STATES PATENT OFFICE 2,423,243

TWO-SPEED DRIVE MECHANISM

John E. Lovely, Springfield, Vt., assignor to Jones & Lamson Machine Company, Springfield, Vt., a corporation of Vermont Application June 28, 1943, Serial No. 492,513

4 Claims. (Cl. 172—239)

This invention relates to mechanism by which a driven mechanism may be driven selectively at either of two speeds, and has for an object to simplify and improve the control of the transition from one to the other of the speeds. To these ends the high speed is derived from a torque motor, which, when the low speed drive is effective, is rotated idly thereby. When the motor is energized to impart the high speed drive, it is thus already rotating, so that immediately upon its energization it takes the load and builds up to the high speed, no time being lost in starting its rotation and bringing it up to the speed of the low speed drive before it becomes operative.

By employing a reversing motor and energizing it in the reverse direction to its driving rotation when it is desired to effect drive at the low speed, it acts as a brake to reduce the drive speed to that of the low speed drive quickly. In order that no positive effect of the reversed energization of the motor tending to reduce the drive speed below the desired low speed value may be present, an over-running clutch may be interposed between the low speed drive and the torque motor so that the braking effect of the motor, except through a friction, ceases as soon as the drive speed has been reduced to the desired working low speed.

By way of example this invention is shown as embodied in a lathe of the well known Fay type, the low and high speed drives being applied to the cam drum by which the cycle of the machine is determined.

Referring to the drawings,

Figure 1 is a detail sectional view through the cam drum drive mechanism.

Figure 2 is a detail sectional view on line 2—2 of Figure 1.

Figure 3 is a detail sectional view on line 3—3 of Figure 1.

Figures 4 and 5 are wiring diagrams illustrating alternate methods of low and high speed control.

The Fay lathe to which this invention is shown as applied is in general the same as that illustrated in my Patent No. 1,923,493, granted August 22, 1933, for Lathe.

Beneath the lathe headstock there is mounted a cam shaft 10 on which is supported a cam drum 11 having suitable cams thereon for determining the cycle of operations of the machine. Beyond the end of the machine frame the cam shaft 10 carries a second cam drum 15 (Figures 4 and 5) which may be provided with certain switch actuating cams as will later appear. The cam shaft 10 is driven at either of two speeds and is shifted from one speed to another at suitable times during the cycle of operations by the action of the switch cams on the drum 15. The low speed drive is derived from the mechanism which rotates the work spindle, as is fully illustrated in my prior Patent No. 1,923,493. A portion of this drive comprises a vertical shaft 18 corresponding to the shaft 315 of my prior patent and receiving its power through suitable gears in a gear box corresponding to the box 306 of my prior patent.

The lower end of the shaft 18, as shown best in Figure 1, is coupled to the upper end of a short stub shaft 19 journaled in a gear casing 20. To the lower end of the shaft 19 there is secured a bevel pinion 21 which meshes with a bevel gear 22 journaled on roller bearings 23 on a hub member 24 keyed to a horizontal cross worm shaft 25. The gear 22 has a hub portion 26 which rides between end plates 27 and 28 keyed to the worm shaft 25. The member 24 forms the inner member of a one-way clutch, in all respects similar to a second clutch on the opposite end of the cam shaft 25 which is shown in cross section in Figure 3. This second over-running clutch 30 is interposed between the opposite end of the shaft 25 and the hub 31 of a beveled gear 32. This hub 31 is mounted on spaced roller bearings 33 on a hub member 34 which is keyed to the shaft 25. The arrangement is such that when the gear 32 is driven in the same direction as the shaft 25 and at a higher rate, the spring pressed rollers 35 of the one-way clutch connect the hub portion 31 of the gear 32 in driving relation to the shaft 25 through the member 34, but that whenever the shaft 25 is rotating faster than the gear 31, it is free to do so without reference to the speed of rotation of the gear 32, the over-running clutch then becoming disconnected.

Similarly the shaft 25 may be driven at a rate higher than the low speed drive derived from the rotation of the shaft 19, the over-running clutch hub 26 then being disconnected, but whenever the shaft 25 is driven through the gear 32 at a rate which would be less than that imparted by the low speed drive from the shaft 19, this over-running clutch becomes effective to drive the shaft 25. The shaft 25, intermediate to its ends, has keyed thereto a worm sleeve 40 having worm teeth meshing with a worm wheel 41 fixed to the cam shaft 10, all as is shown in my prior patent to which reference has been made. Thus the low speed drive shown herein is substantially identical with that shown in my prior patent.

The high speed drive as shown herein, however, is quite different, being derived by the rotation of a high speed reversible motor 50 (Figures 4 and 5), and independently from the drive for the remainder of the machine. This motor 50 is provided with a drive shaft 51 (Figures 1 and 2) carrying a bevel pinion 52 which meshes with the teeth of the bevel gear 32. This gear, however, is connected to the worm shaft 25, not only through the over-running clutch at 30, but also through a friction drive. As shown best in Figure 1, this friction drive comprises a spider 55 keyed to rotate with the shaft 25, on either side of the reduced thickness outer portion of which there is positioned a composition friction ring 56. A follower ring 57 is pressed against the outer of these brake rings 56 and the inner brake ring is pressed against the outer face of the hub 31 by a plurality of calibrated springs 58. Each of these springs reacts between the head 59 of a bolt 60 threaded through the gear 32 and secured as by a nut 61, these springs being seated in recesses in the follower ring 57. During the slow speed drive of the worm shaft 25 from the headstock spindle drive mechanism, the motor 50 is not energized, but the shaft 25 is connected through the friction drive to the bevel gear 32, so that this bevel gear is rotated and the rotor of the motor 50 is driven idly therefrom. As soon as the motor 50 is energized in forward direction, it immediately picks up speed and as the gear 32 immediately becomes driven at a rate faster than that imparted to the worm shaft 25 by the low speed drive, immediately it takes over the drive of this worm shaft through the clutching of its over-running clutch at 30, and the action of the over-running clutch at the low speed drive end of the shaft 25 immediately releases and allows the work shaft 25 to be rotated at the higher speed derived from the motor.

When it is desired that the low speed drive take over, the energization of the motor is reversed, so as to tend to make it rotate in a backward direction, thus immediately rapidly slowing down its rotation, and the friction drive between it and the shaft 25, thus interposes a braking effect, quickly slowing down the rotation of this shaft 25 to the low speed value. However, as soon as this speed reaches that of the low speed drive, the low speed drive over-running clutch becomes effective and as the motor speed is reduced to below this drive speed, the over-running clutch for the high speed drive opens so that the braking effect of the high speed drive is no longer directly effective, but is exerted entirely through a friction brake connecting the motor with the worm shaft in parallel to the over-running clutch and which slips as long as reverse energization of the motor continues. The motor may then be deenergized, whereupon its rotor becomes driven idly through the friction drive mechanism from the worm shaft 25.

In Figures 4 and 5 are shown alternative methods of control of the energization of the motor to follow out the cycle thus described. Thus in Figure 4 the motor 50 is shown as energized from the lines 70 and 71 through a double pole reversing switch at 72 having three positions, forward, neutral and reverse. As shown it is in forward position where it is placed by the action of a cam 73 on the drum 15 which has moved a switch actuating lever 74 connected through a link 75 with the switch. In this position of the parts, the motor is energized for fast speed. As the cam shaft 10 continues to revolve, the control lever 74 is moved by the cam 76 into the first dotted line position, causing the switch 72 to be thrown to reverse position, this acting to reverse the energization of the motor and slowing its speed rapidly, and likewise through the friction clutch, the speed of rotation of the cam shaft 10. Thereafter the cam 77 on the cam drum returns the actuating lever 74 to neutral position where the motor 50 is de-energized and the low speed drive is in driving relation to the cam shaft 10, and the motor rotor is driven idly thereby. As the cam drum continues to rotate, a cam 78 thereon similar to the cam 73 comes into position to throw the lever 74 to the position shown in this figure to cause resumption of the fast speed, this cam 78 starting another cycle of control, the cam drum then being in fast motion.

In Figure 5, a modification is shown in which the double pole double throw reversing switch 720 has but two positions, forward and reverse. In the reverse position shown, current passes to the motor from the leads 70 and 71 through the switch 720 from the line 70, through leads 80, 81, 82, 83, delay relay switch 84, lead 85, the switch 720 and line 71. After an interval depending upon the characteristics of the actuating coil 87 of the switch 84, which receives current from the line 70, through leads 80, 88, 85 and switch 720 to the line 71, the switch 84 is opened, thus breaking the circuit through the motor M, which thereupon stops. The cam shaft 10 is then rotating at low speed and the rotor of the motor is driven idly thereby. When the cam 90 carried by the cam drum 15 then comes into position to actuate the lever 74, it throws it to forward position, connecting the line 70 through lead 82 to the motor through lead 81, the other pole of the switch 720 to the line 71, thus conditioning the motor for forward drive, which as heretofore described, causes the motor to drive the cam shaft 10 at the high speed. This persists until such time as a second cam 99 is effective to again reverse the switch 720 and again condition the mechanism for low speed drive.

From the foregoing description of certain embodiments of this invention, it should be evident to those skilled in the art that various other changes and modifications might be made without departing from the spirit or scope of this invention.

I claim:

1. A two-speed drive mechanism including a driven member, a low speed drive mechanism, connections including an over-running clutch between said low speed drive mechanism and driven member allowing said driven member to be driven at a faster rate than the rate when driven by said low speed drive mechanism, a motor, high speed drive connections including an over-running clutch between said motor and said driven member, allowing said low speed drive mechanism to drive said driven member when said motor is ineffective to drive said driven member at a rate faster than that produced by said low speed drive mechanism, and means for controlling said motor.

2. A two-speed drive mechanism including a driven member, a low speed drive mechanism, connections including an over-running clutch between said low speed drive mechanism and driven member allowing said driven member to be driven at a faster rate than the rate when driven by said low speed drive mechanism, a motor, high speed drive connections including an over-running clutch between said motor and said driven member, allowing said low speed drive mechanism to drive said driven member when said motor is ineffective to drive said driven member at a rate faster than that produced by said low speed drive mechanism, a friction driving connection between said motor and said driven member arranged in parallel with said high speed drive over-running clutch, and means for controlling said motor.

3. A two-speed drive mechanism including a driven member, a low speed drive mechanism, connections including an over-running clutch between said drive mechanism and driven member allowing said driven member to be driven at a faster rate than the rate when driven by said low speed drive mechanism, a reversible motor, connections between said motor and driven member including an over-running clutch causing said driven member to be driven by said motor in the same direction as by said low speed drive mechanism but at a faster rate when said motor is turning in one direction, a friction drive between said motor and member independent of said over-running high speed clutch acting as a brake to the rotation of said driven member when said motor is running at a speed lower than sufficient to rotate said driven member, and rotating said motor from said low speed drive when said motor is de-energized, and motor controlling mechanism including a forward and reverse switch, and means for actuating said switch to forward motor position to change from low to high speed drive of said driven member, and to first actuate said switch to reverse drive to quickly slow said driven member through said friction drive to said motor and then to open said switch to change from high speed motor drive to low speed drive by said low speed drive mechanism.

4. A two-speed drive mechanism including a driven member, a low speed drive mechanism, connections including an over-running clutch between said drive mechanism and driven member allowing said driven member to be driven at a faster rate than the rate when driven by said low speed drive mechanism, a reversible motor, connections between said motor and driven member including an over-running clutch causing said driven member to be driven by said motor in the same direction as by said low speed drive mechanism but at a faster rate when said motor is turning in one direction, a friction drive between said motor and member independent of said over-running high speed clutch acting as a brake to the rotation of said driven member when said motor is running at a speed lower than sufficient to rotate said driven member, and rotating said motor from said low speed drive when said motor is de-energized, and motor controlling mechanism including a forward and reverse switch, and means for actuating said switch to forward motor position to change from low to high speed drive of said driven member, and to first actuate said switch to reverse drive to quickly slow said driven member through friction drive to said motor and then to open said switch to change from high speed motor drive to low speed drive by said low speed drive mechanism, said switch actuating means including a time delay device for controlling the time during which said switch is in reverse position.

JOHN E. LOVELY.

REFERENCES CITED

The following references are of record in the file of this patent:

UNITED STATES PATENTS

| Number | Name | Date |
| --- | --- | --- |
| 314,207 | Ward | Mar. 17, 1885 |
| 990,999 | McGuire et al. | May 2, 1911 |
| 1,951,875 | Laabs | Mar. 30, 1934 |
| 2,105,914 | Fritzsch | Jan. 18, 1938 |
| 2,186,999 | Stone et al. | Jan. 16, 1940 |
| 1,923,493 | Lovely | Aug. 22, 1933 |

FOREIGN PATENTS

| Number | Country | Date |
| --- | --- | --- |
| 15,655 | Great Britain | Sept. 15, 1891 |